Jan. 17, 1928.
R. SCHÄFER
INTERLINER
Filed June 17, 1926
1,656,832
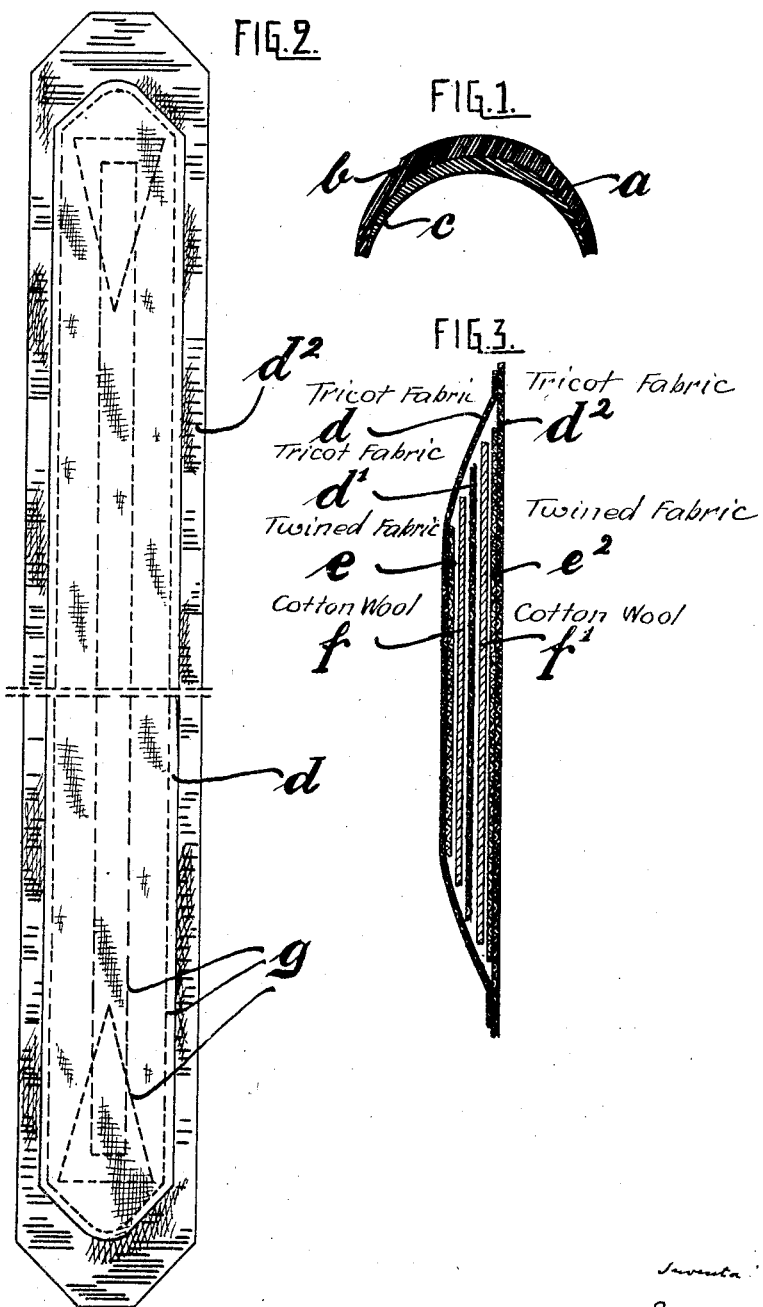

Patented Jan. 17, 1928.

1,656,832

UNITED STATES PATENT OFFICE.

RICHARD SCHÄFER, OF MAGDEBURG, GERMANY, ASSIGNOR TO MAXIMILIAN WIESENTHAL, OF MAGDEBURG, GERMANY.

INTERLINER.

Application filed June 17, 1926, Serial No. 116,717, and in Germany July 6, 1925.

This invention relates to an interliner for wheel-tires, designed to prevent piercing of the air-tube by foreign bodies which have penetrated through the cover of the wheel-tire.

The interliner, according to the invention is composed of a number of layers of different materials, as tricot fabric, twine fabric and cotton-wool.

A protecting strip for carrying out the improved method is shown, by way of example, in the accompanying drawings in which:—

Fig. 1 is a cross section through a wheel tire with protecting strip inserted.

Fig. 2 shows the protecting strip in plan view and

Fig. 3 is a cross section of the same.

As can be seen from Fig. 1 a protecting strip $a$ composed as will be hereinafter described is inserted between the cover $b$ and the air-tube $c$ of a wheel tire. The protecting strip $a$ as shown in Figs. 2 and 3 has given very good results and it consists of superposed strips of different materials. The outer layer $d$ of the protecting strip is made from a tricot-like fabric, the next second layer $e$ consists of a twine fabric, the next third layer $f$ is made of cotton wool, the fourth or central layer $d^1$ is made of a tricot-like fabric, the fifth layer $f^1$ is of cotton wool, the sixth layer $e^2$ of twine fabric and the seventh layer $d^2$ consists of a tricot-like fabric.

All the layers are connected with one another by means of seams $g$ so that a protecting strip is formed which comprises a thick central portion and is flat at the edges its shape being adapted to the shape of the tire cover and of the air-tube. In order to prevent prejudicial friction the protecting strip is rubbed, prior to be inserted, with a substance for instance talcum.

I claim:—

An interliner for wheel tires, consisting of layers of different materials superposed as follows a layer of tricot fabric, a layer of twine fabric, a layer of cotton wool, a central layer of tricot fabric, a layer of cotton wool, a layer of twine fabric and a layer of tricot fabric.

In testimony whereof I affix my signature.

RICHARD SCHÄFER.